United States Patent [19]
Paul, Jr.

[11] 3,789,976
[45] Feb. 5, 1974

[54] CONVEYOR

[75] Inventor: Dwight D. Paul, Jr., Mount Clemens, Mich.

[73] Assignee: M. S. C. Inc., Mount Clemens, Mich.

[22] Filed: Nov. 18, 1971

[21] Appl. No.: 200,010

[52] U.S. Cl. ............................................. 198/219
[51] Int. Cl. ........................................... B65g 25/04
[58] Field of Search .................................. 198/219

[56] References Cited
UNITED STATES PATENTS
2,791,338   5/1957   Thaon De Saint-Andre....... 198/219
1,367,061   2/1921   Lewis.................................. 198/219

FOREIGN PATENTS OR APPLICATIONS
366,293    2/1932   Great Britain...................... 198/219

Primary Examiner—Evon C. Blunk
Assistant Examiner—Joseph E. Valenza
Attorney, Agent, or Firm—Burton & Parker

[57] ABSTRACT

A reciprocating bar conveyor having a plurality of parallel eccentrically supported bars angularly spaced from each other and grouped into at least two sets. Each set may be angularly spaced from each other set, and each set includes at least six bars which are individually angularly spaced from each other bar of the set. Each set of bars is supported on a pair of eccentric axles, only one of which need be connected to a drive motor.

5 Claims, 10 Drawing Figures

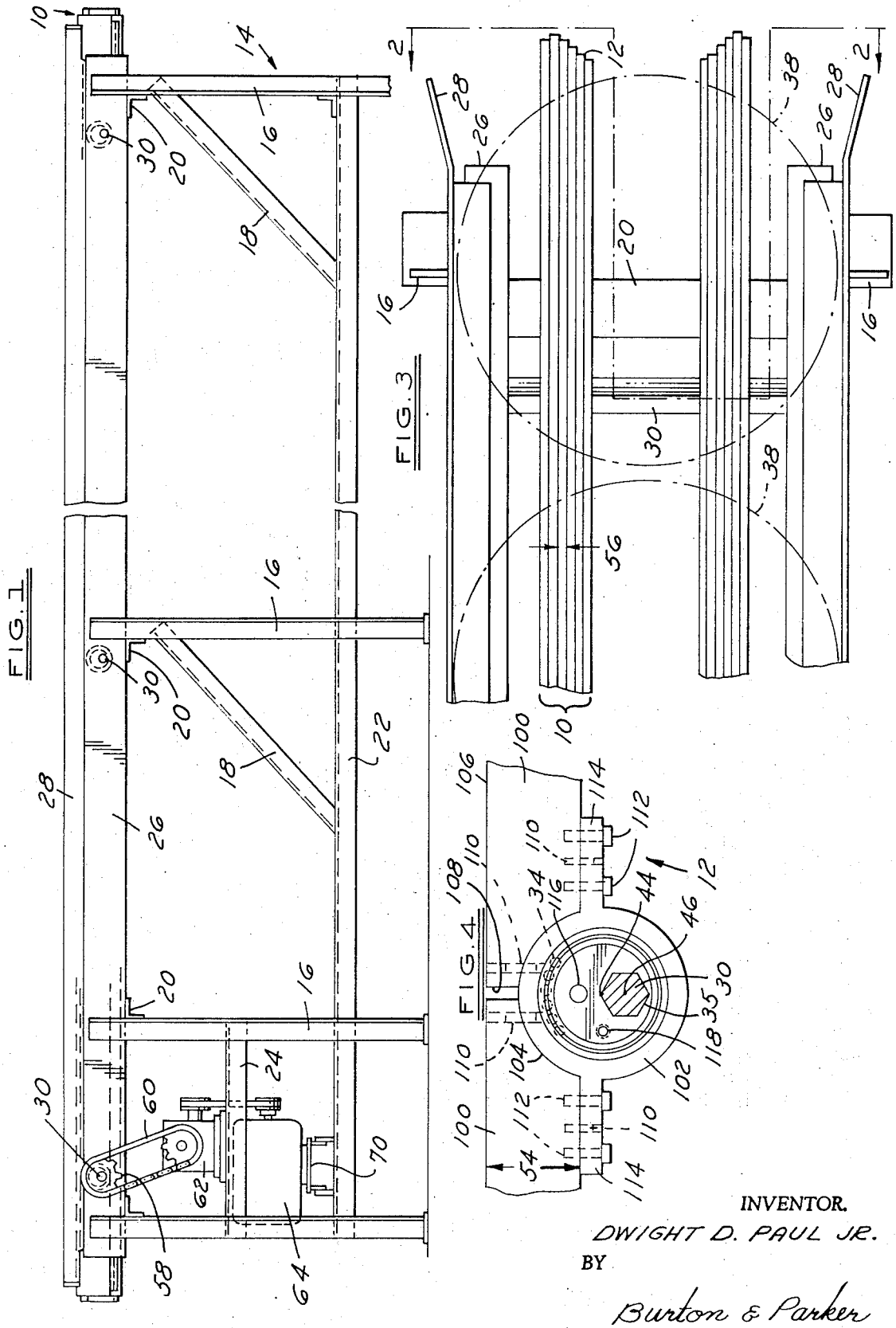

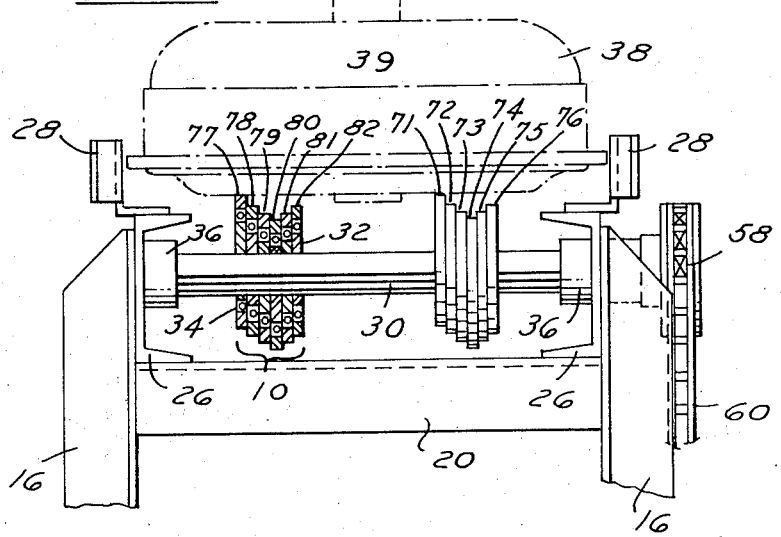
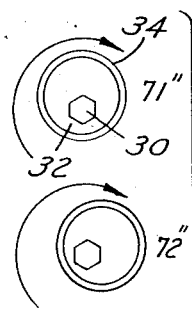
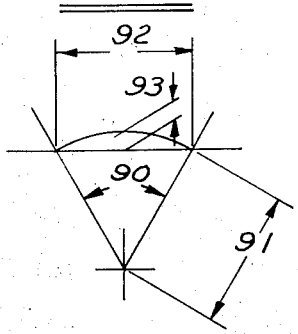
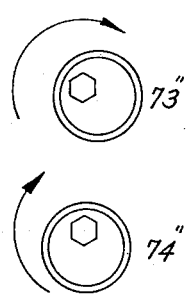
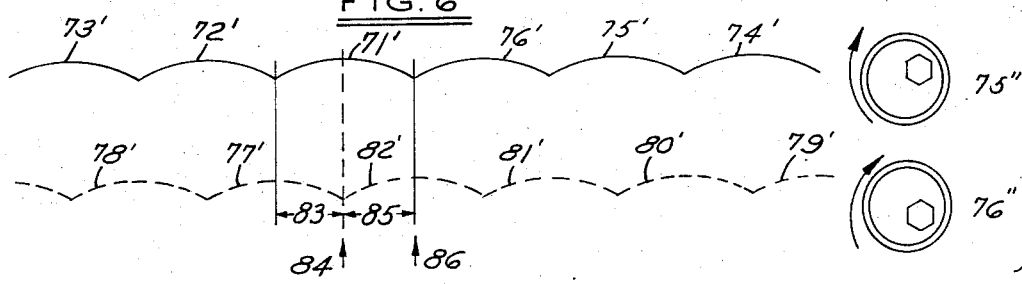
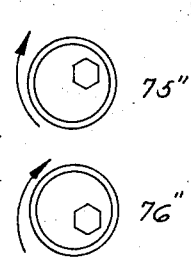
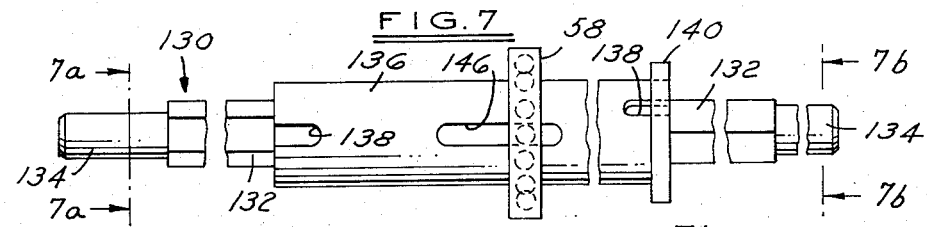
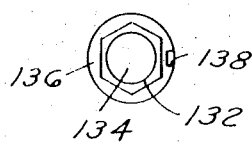
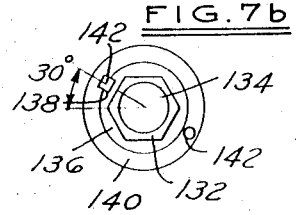
INVENTOR.
DWIGHT D. PAUL JR.
BY
Burton & Parker
ATTORNEYS

CONVEYOR

BACKGROUND OF THE INVENTION

In reciprocating bar conveyors of the type shown in U. S. Pat. No. 2,791,338, the efficiency of the conveyor suffers from utilizing a substantial portion of the driving power in simply lifting the load being conveyed. In addition, the vertical velocity of the load causes undesirable vibration and chatter on the conveyor, and horizontal velocity is relatively low in relation to the power input. Also, I have found that in a conveyor of the type disclosed in said patent, each axle which eccentrically supports the conveying bars, must be powered otherwise the conveyor will not function or will not function properly.

SUMMARY OF THE INVENTION

Objects of this invention are substantially increase efficiency of reciprocating bar conveyors; drive the conveyor by connecting the power train to only one axle of each set of bars; obtain for a given power input a greater horizontal velocity and a lower vertical velocity than in the prior art; increase the allowable weight of articles which may be conveyed using a lesser power input than in the prior art; provide a simpler construction; and reduce cost.

I have discovered these and other objectives may be obtained by providing a conveyor with at least two sets of bars for cooperatively supporting the articles to be conveyed with each set comprising at least six bars and with each bar of a set angularly spaced from each other bar of the set. Other features will become apparent from the following description.

BRIEF DESCRIPTION OF THE DRAWINGS

FIG. 1 is a side elevational view along the length of a conveyor;

FIG. 2 is an end view, partly in section, along the line II—II of FIG. 3;

FIG. 3 is a fractional top view of the end of the conveyor;

FIG. 4 is a detail of an axle showing the modular eccentric arrangement;

FIG. 5 is a schematic plan of the relationships between the number of bars and the efficiency of a step;

FIG. 6 is a schematic plan of several different steps;

FIG. 7 is a planar view of a driving axle showing a phasing sleeve between sets of bars;

FIGS. 7a and 7b show the phasing arrangement provided for by FIG. 7; and

FIG. 8 is an expanded view showing the relationship of all the eccentrics within one set of six bars.

DETAILED DESCRIPTION OF THE PREFERRED EMBODIMENT

Referring more particularly to the drawings, reference numeral 10 indicates a set of supporting bars while 12 indicates any single supporting bar.

As shown in side elevation in FIG. 1, and end elevation in FIG. 2, a frame 14 comprising upright members 16, braces 18, and cross members 20 and 22, support two parallel, spaced beams 26 in which axles 30 are journalled and bearing mounted in a conventional manner. The embodiment shown in FIGS. 1, 2 and 3 includes a pair of guide rails 28 to prevent any sideward movement of the articles 38 being conveyed. The axles 30 are spaced apart from one another over the length of the conveyor so that the sets of bars and the articles carried are adequately supported without appreciable bending of each of the bars 13 as they sequentially support the objects carried.

In the embodiment shown in FIG. 4, each bar 12 is formed from one or more beams 100 and annular connection members 102. The beams 100 are made from rectangular bar stock having width 54 and thickness 56 and made from structural materials such as steel or aluminum. The beams have a half semicircular recess 104 at each end 108 so that when connected to the annular connecting member 102, they will form a flat continuous surface 106 from beam to beam across their ends 108, also their sides will form a flat surface so that bars 12 can be closely positioned together without interfering with each other. Dowell pins 110 and bolts 112 secure each beam 100 to the annular members 102 to provide a rigid continuous bar 12 of the desired length. The ends 108 may leave a small gap between beams to facilitate assembly. If desired, a strip of hard, wear-resistant material (not shown) may be attached to the top surface 106 to reduce wear, eliminate any gaps at 108, and further rigidify the bar.

The annular connection members 102 are made from structural material and have flanges 114 to provide secure mountings for the beams 100. The connection members 102 have the same thickness 56 as do the beams 100 so that the bars 12 have a uniform thickness. The interior diameter of the annular member is sized so that a bearing 34 will press fit securely into this diameter. The bearing 34 is in turn press fit around a circular eccentric disc 32 which is to be securely mounted on the axle 30. The bearing 34 has the same thickness as or slightly lesser than the bar 12.

The eccentric disc 32 has the center 44 of its external radius offset from the center 46 of the aperature 35 through which the axle 30 passes. The eccentric disc also is provided with holes 116 and 118, both equidistant and angularly spaced from the center of the axle aperture 46 according to the number of bars 12 in each set 10. For example, if there are 6 bars in a set, the holes 116 and 118 will be spaced 60° apart. It will be noted that the center 44 of the eccentric disc 32 falls on the line between hole 116 and the center 46 of the aperture 35. Hole 116 is sized to receive the head of a small bolt and 118 is threaded to secure the corresponding bolt on the adjacent eccentric. In this manner, eccentric discs 32 on adjacent bars 12 can be securely fastener together to form a solid unit having substantial strength on the axle 30. The distance between centers 44 and 46 determines the eccentricity and forward motion of the conveyor as described below.

In order to provide clearance between the relatively moving parts of adjacent bars 12, the discs 32 may be made slightly thicker than the bars 12. The apertures 35, if the axle 30 is non-round, must be oriented so that proper angular spacing will occur between adjacent bars 12. I have found this to be most conveniently done by either bisecting a side of the aperture 35 with a radius through the center 44 of the disc as in FIG. 4, or aligning the vertices of the aperture 35 with a radius through the center 44 as shown schematically in FIG. 8. At the end of each bar 12, it is more convenient, and provides a stronger bar, if the last beam 100 extends as a unit over the end axle 30. This can be done simply by providing a full semicircular recess 104 in the beam 100 the appropriate distance from the end of the bar 12.

If the bar 12 is composed of only a single beam 100, it may be more convenient to avoid the use of annular connecting members entirely and incorporate a circular aperture in the beam 100 to receive the bearing-disc-axle combination directly within the beam. This arrangement is shown by the bars in FIG. 2.

Two groups or sets 10 of bars 12 are employed with a separation between the sets on the axle 30 so that the articles 38 are supported on both sides of their centers of mass 39. However, many sets of bars 10 may be employed if needed to provide more continuous lateral support for the articles conveyed.

When two groups 10 of bars 12 are employed, it is usually desirable that there be an angular spacing between the sets so that optimum efficiency will be achieved. This angular spacing effectively doubles the number of bars that pull through the non-driving axles if unitary axles are used, thus providing a smoother transfer of power to the non-powered axles. This angular spacing can be achieved through use of eccentric discs 32 having their apertures aligned in the two ways described above and mounted on a unitary axle of polygonal bar stock. In this case mounting collars 36 in FIG. 2 enable the axles to rotate freely in the supporting beams 26. However, a preferable method of obtaining angular spacing between sets is by the use of a compound axle 130 as shown in FIG. 7. Since this angular spacing between the sets need only be applied through one common axle, the remaining axles can be independently mounted for each set if it is not desired to use compound axles throughout.

The compound axle 130 is composed of three parts: polygonal portions 132 for supporting each set of eccentrics, cylindrical portions 134 for mounting the axle in the frame 26, and a cylindrical sleeve portion 136 for connecting the two polygonal portions. The cylindrical mounting portions 134 are preferably made by machining the end of a solid length of polygonal bar stock, such as hexagonal or octagonal, thus forming the polygonal portion 132 and the mounting portion 134 from a solid piece of material. The length of the sleeve 136, and consequent spacing of the sets 10 of bars will depend upon the use of the conveyor. The sleeve 136 has its interior machined at each end so that each polygonal portion 132 will be press fitted into fixed angular relationship with each other. For example, as shown in FIGS. 7a and 7b, hexagonal portions, since they have faces 60° apart, will be offset 30° from each other. Also shown in the sleeve 136 are keyways 138 to hold dogs 140 which are used for securing the set of eccentrics to the axle 130. The dog 140 fits over the end of the sleeve 136 and has a hole 142 positioned so that a bolt can connect with the threaded hole 118 of the first eccentric 32 in the set. The dog is provided with a key 142 so that a large amount of torque can be applied to the axle. Provision can be made in the sleeve 136 also for a drive sprocket 58 and its keyway 146.

The driving sprocket may be internal, as shown in FIG. 7 or may be on an extension of the driving shaft 30 passing through the supporting beam 26, as shown in FIG. 2. A chain or belt 60 then connects to the motor 64 through a gear reduction unit 62 as shown in FIG. 1. The motor 64 and gear reduction unit 62 are mounted on the frame 14 by brackets 70 and 24 so that a constant tension slackless drive is maintained.

Since only one axle need be coupled to all sets of bars, the remaining supporting axles 30 can be independent for each set 10 of bars. The supporting axles can be conveniently made by machining a length of polygonal bar stock at each end and journalling these into the frame. It is most efficient if the coupling axle is also the driving axle since then the power is evenly applied to both sets of bars.

The order of positioning of the bars within each set is unimportant so long as the minimum spacing between sets is sufficient to provide stable support for the article carried. In the example of FIG. 2, the minimum spacing occurs when bars 71 and 82 are the supporting pair of bars.

The phase relationship between the bars should be uniform to provide a smooth ride reducing vibration to a minimum. However, it is possible to use any phase sequencing between the bars even though loss of efficiency will result. The phase relationship between sets also should be uniform to provide maximum efficiency. FIG. 8 shows one set of eccentrics separated and numbered 71'' to 76'' to show the phasing between the individual bars 71 to 76 as in FIG. 2. In this case since six bars are used, each eccentric is one-sixth of a complete cycle from the adjoining eccentrics or 60°.

The solid lines of FIG. 6 show the path of one side of an article conveyed by one set of evenly spaced bars. The dashed line in FIG. 6 is the path of the other side of the article supported by the other set. Due to the off-set positioning, it is obvious that the article conveyed will rock back and forth as it proceeds along the conveyor similar to the waddle of a duck.

To illustrate the operation through one cycle, the two sets of six bars in FIG. 2 are individually numbered from 71 to 82 respectively, and the corresponding primed reference numbers 71' to 82' in FIG. 6 indicate the interval during which each bar is supporting the article carried. Suppose bars 71 and 77 in FIG. 2 are instantaneously supporting the article conveyed, as pictorially shown in FIG. 6 by the interval 83. In the interval 83, bar 77 is descending in its arc while bar 71 is rising as shown by 77' and 71' respectively. At point 84, bars 77 and 82 are both instantaneously supporting the article on one side as 77 falls and 82 rises. At this point, the support shifts from 77 to 82. Also at point 84, bar 71 is at the highest point of its trajectory and after this begins its fall. During the interval 85, bars 82 and 71 support the article. At the end of interval 85, bar 71 has fallen to an equal point with rising bar 76. At this point, 86, the support of the article in the right set shifts from bar 71 to bar 76. Simultaneously at point 86, bar 82 reaches its highest point and begins to decline. This process continues with the article supported in turn by pairs of bars with one bar of each pair replaced at a time. Thus the supporting pairs of bars through one cycle in sequence are: (71, 77), (71, 82), (76, 82), (76, 81), (75, 81), (75, 80), (74, 80), (74, 79), (73, 79) (73, 78), (72, 78), and (72, 77) which leads back to the starting pair (71, 77).

If the operation of the motor is reversed, the conveyor will transport the articles in the reverse direction and the bars will move in the reverse sequence.

FIG. 5 shows schematically the factors involved in determining the ratio of forward carry to rise-and-fall of the article conveyed. The radius 91 is the distance between the axis of the axle 46 and the axis of the eccentric disc 44. The radius 91, which is the degree of eccentricity of the bars, does not affect the ratio of the height 93 through which the article 38 rises and falls to the distance traversed 92 by the article while supported by one bar. This ratio depends solely on the angle 90 and the angle 90 is determined solely by the number of bars in a set if uniform spacing is provided. For six bars, angle 90 is 60°; for eight bars, angle 90 is 45°, and so forth. As the angle 90 becomes smaller the ratio of 92 to 93 becomes larger. The larger this ratio becomes, the more energy is used to transport the article forward and the less is wasted by rise and fall of the article conveyed. Table I gives the ratio of the forward travel 92 to the rise-and-fall 93 and indicates the change resulting from adding more bars.

TABLE I

| Number of bars | Angle 90 (°) | Ratio of 93:92 |
|---|---|---|
| 2 | 180° | 2.0:1 |
| 3 | 120° | 3.5:1 |
| 4 | 90° | 4.8:1 |
| 6 | 60° | 7.5:1 |
| 8 | 45° | 10.0:1 |
| 10 | 36° | 12.6:1 |
| 12 | 30° | 14.8:1 |

It will be noted that the saving in energy caused by adding more bars to the set falls off very rapidly once the set becomes larger than 10 or 12 bars.

A counterbalancing consideration to continually increasing this ratio by increasing the number of bars is the increase of frictional energy losses which occur with the addition of bars within the sets. While the optimal number of bars will depend upon several design factors listed below, there eventually reaches a point where the increase in frictional energy loss exceeds the energy gain by addition of more conveying bars within a set. The factors involved in this tradeoff include the length of the conveyor (and consequent number of friction producing axles), the weight of the articles conveyed, the friction properties of the bearings used, the speed at which the conveyor is run, and the number of starts/stops in use of the conveyor. Another obvious factor is the space that a set of bars will occupy. For most industrial applications the optimal number of bars per set ranges between six and 10, while for warehouse applications the optimum may range up to 16 per set.

It will be obvious to the careful observer that if the center of gravity 39 of the objects carried lays along the axis of rotation of the rocking motion of the sets of bars, then there is no advantage in increasing the number of bars in a set beyond three or four becasue there is no vertical motion of the center of gravity. However, this is seldom the case. Even a symmetrical object, as shown in FIG. 2, will have its center of gravity rise and fall, which results in consumption of energy, unless it is exactly positioned on the axis of rotation. Consequently, a plurality of bars is needed to optimize practical operation.

Although even numbers of bars have been shown in each set, this is only for convenience in providing exact angular spacing of the sets. An odd number of bars is within the contemplation of this invention although care must be taken that the angular spacing is uniform otherwise the waddling duck motion of the articles conveyed will resemble a waddling duck doing a cha-cha.

Another factor affecting the number of bars employed in a set is the type of drive that is used. If it is desired to drive the conveyor through only one axle thus avoiding hazardous, expensive and complicated driving mechanisms, then at least six bars must be employed in a set. If fewer bars are used in a set, power consumption will be greatly increased. This increase in power consumption results from the difficulty of pulling the bars through a cycle. If the number of bars is not large enough, the conveyor can actually stall out, particularly under heavy loads when used as an accumulating conveyor. The smoothness of the conveyor operation increases as the number of bars increases. Even six bars has been found to give unsatisfactory operation unless the eccentricity (the distance between centers 44 and 46 in FIG. 4) is large enough. However, increasing the eccentricity much beyond the radius of the axle unduly increases the amount of torque required, and this will necessitate heavier construction of the bars and axles requiring more costly materials. This also adds to the weight of the moving parts, requiring larger forces and more power to start the conveyor or reverse directions.

There is no limit to the load that can be carried by this method. For heavier loads, it is merely necessary to provide more closely spaced axles or increase the size of the bars. There is likewise no limit on the length of the conveyor providing that sufficient power is supplied. In cases where the heaviest loads are to be conveyed over long distances, for example, pallets weighing two and a half tons or more, over a distance of 35 feet, it may be desirable to drive more than one axle to assure adequate performance. This can be done using conventional techniques. In the example, a 20 horsepower electric motor will move the pallets at a rate of fifteen feet per minute and accumulate them over the entire length satisfactorily.

For most applications, however, it is more than adequate if one axle is driven. For example, a one-quarter horsepower electric motor will have no problem accumulating 100 pound parts on a four foot conveyor at the rate of 60 feet per minute. In another example, a 0.9 horsepower motor is utilized to convey 460 pound pallets at 50 feet per minute on a 2½ foot conveyor.

What is claimed is:

1. A conveyor comprising a pair of parallel sets of parallel article supporting and conveying bars with each set comprising at least six bars, means supporting the bars of each set in angularly spaced eccentric relation with each bar equally angularly spaced from each other bar of the set for eccentric movement beneath an article resting thereon, said means supporting the bars being arranged to continuously present, during eccentric movement of the bars, a pair of bars with one from each set in cooperative article supporting relation on opposite sides of the center of mass of an article supported on the bars, said means for supporting the bars including a pair of regular polygonally shaped axles disposed spaced apart longitudinally of the bars and each having the same number of faces as the number of bars in each set and with the number of bar faces being at least six in number, a plurality of identical bar supporting discs with one for each bar, said discs having corresponding off-center polygonal apertures sized to slidably fit in driven relation on the polygonal axles and with the discs received thereon in angularly spaced relation in accordance with the angular spacing of the faces of the axles, each bar mounted on one of the discs on each axle to be driven in eccentric movement as aforesaid upon rotation of the axles, and means connected to one of the axles for rotating the same and thereby driving the bars.

2. The invention as defined by claim 1 wherein there is a polygonal axle for each set with the number of sides of the polygon being a function of the number of bars in the set, and the axles of the pair of sets are end connected in angular offset relation equal to one-half the angle between the sides of the polygonal shape of the axles.

3. In a conveyor as defined in claim 1 where the means for driving the bars is connected to both sets of bars.

4. A conveyor as defined in claim 1 wherein the means for supporting the bars comprises a pair of axles for each set and eccentrics thereon supporting the bars, and the means for driving the bars is connected only to one of the axles of each set.

5. A conveyor as defined in claim 1 wherein the eccentric discs have a thickness greater than the thickness of the bars and each of the bars in a set being in close proximity and having their eccentric discs touching to provide clearance between adjacent bars.

* * * * *